United States Patent [19]
Henot

[11] Patent Number: 5,041,908
[45] Date of Patent: Aug. 20, 1991

[54] THROUGHPUT REGULATION METHOD FOR DATA FOR ASSISTANCE IN THE RECONSTRUCTION OF SUB-SAMPLED MOVING ELECTRONIC IMAGES

[75] Inventor: Jean-Pierre Henot, Thorigne Fouillard, France

[73] Assignees: L'Etat Francais (CNET); Telediffusion de France, both of France

[21] Appl. No.: 369,466

[22] Filed: Jun. 21, 1989

[30] Foreign Application Priority Data

Jun. 24, 1988 [FR] France .................................. 88 08705

[51] Int. Cl.⁵ ............................................... H04N 7/12
[52] U.S. Cl. .................................... 358/133; 358/138; 358/141
[58] Field of Search ............... 358/138, 140, 133, 135, 358/136, 12, 13, 105, 141

[56] References Cited

U.S. PATENT DOCUMENTS

| | | | |
|---|---|---|---|
| 3,887,763 | 6/1975 | Hinoshita et al. | 358/133 X |
| 4,745,458 | 5/1988 | Hirano et al. | 358/11 |
| 4,785,348 | 11/1988 | Fonsalas et al. | 358/138 X |
| 4,853,779 | 8/1989 | Hammer et al. | 358/133 |
| 4,862,264 | 8/1989 | Wells et al. | 358/138 |

Primary Examiner—Victor R. Kostak
Attorney, Agent, or Firm—Barnes & Thornburg

[57] ABSTRACT

A method for the regulation of the throughput of assistance data is provided. The assistance date assists in the reconstruction of subsampled moving electronic images. The method is particularly useful for HDTV transmission by a HMAC channel. For each elementary block of the image, an optimal processing operation is selected from first and second parallel processing operations. The second processing operation includes an image filter, and the first processing operation includes a motion compensation process. The first processing operation generates a larger data throughput rate of assistance data than the second processing operation. If the throughput rate of assistance data approaches or exceeds the maximum throughput rate permitted for a transmission unit, the second processing operation which produces a smaller data throughput rate is automatically selected.

6 Claims, 3 Drawing Sheets

THROUGHPUT REGULATION METHOD FOR DATA FOR ASSISTANCE IN THE RECONSTRUCTION OF SUB-SAMPLED MOVING ELECTRONIC IMAGES

BACKGROUND OF THE INVENTION

A television image or picture is defined by a certain number of parameters that represent the spatial and temporal analysis of this image (in particular, the number of images per second, lines per image and pixels per line).

The passband necessary to transmit an HDTV image may attain values of the order of 100 MHz. Thus, to transmit these images on passband channels with reduced width (for example, satellite channels with a band of the order of about ten megahertz), it is necessary to apply passband reduction techniques to these images.

The passband of the signal to be transmitted can be reduced by using adaptive techniques for filtering the high definition image. This filtered high definition image then has a reduced basic passband and may be re-sampled at lower frequencies for transmission. As the filterings are selected in an adaptive way at the transmitter, assistance data are transmitted to the decoder so that it recognizes the processing chosen at the encoder.

These items of assistance data therefore consist of an indicator of the chosen processing, but may also include motion vectors when motion compensation is used.

The throughput rate of the assistance data in the transmission channel is limited to about 1 Mbit/s.

The large quantity of information that these items of data represent makes it necessary to use throughput reduction techniques.

There is a method for the encoding of assistance data described in the conjoint French patent application filed on the same date on behalf of the present applicants, concerning a "method for the encoding of data for assistance in the reconstruction of sub-sampled, moving electronic images."

A characteristic of the encoding of assistance data by this method using the hierarchical code is that it has a variable throughput rate, whereas the throughput rate of the channel is fixed. The regulation of the throughput rate of data leaving the AD (assistance data) encoder therefore proves to be indispensable.

It would seem that no method has been proposed to date.

It is an object of the invention to provide a solution to this problem.

SUMMARY OF THE INVENTION

More precisely, the invention concerns a method for the regulation of the data throughput rate, notably the throughput rate of data for assistance in the reconstruction of an electronic image belonging to a sequence of images, notably in HDTV, using a compressed image signal, the image signal compression process consisting in the segmentation of the image into substantially homogeneous blocks of variable sizes, all the pixels of which can be defined collectively, the possible sizes being capable of classification from a minimal size of elementary blocks, in segmentation levels, each level corresponding to the regrouping of four adjacent lower-level blocks, said compression process comprising a step for the selection, for each elementary image block, of an optimum processing operation among several concurrent, compression processing operations achieved in parallel, the processing operations comprising notably; on the one hand, at least one processing operation with low throughput consumption, of a simple image filtering type and, secondly, at least one processing with high throughput consumption, of a compression by motion compensation type, consisting in associating a motion vector with each block for the reconstruction of the projection of the current block in the following image in the sequence, a method wherein the processing choice is enforced obligatorily from one of the low throughput consumption processings, during said step for the selection of an optimal processing, when the throughput rate of said assistance data approaches or exceeds the throughput rate permitted by the transmission unit. Advantageously, said transmission unit is formed by each image of said image sequence.

According to a first aspect of the invention, the enforcing of the optimal processing choice consists in imposing the choice of a processing with low throughput consumption for all the blocks of the current transmission unit when the throughput rate permitted for the preceding transmission unit is exceeded.

According to a second aspect of the invention, the enforcing of the optimal processing choice consists in a modification of the criterion of processing choice in order to cause variation in the threshold of processing without discrimation or distinction, enabling the selective keeping of the choice of the high throughput consumption processing for images for which said processing is optimal.

Should said optimal processing choice be done on the basis of a criterion of minimization of the psychovisual distortions induced in the reconstructed image, this second enforcing method consists in respectively increasing and decreasing, artificially, the value of the distortions induced by said processing with high throughput consumption.

The first and second enforcing methods do not exclude each other.

BRIEF DESCRIPTION OF THE DRAWINGS

Other features and advantages of the invention shall appear from the following description of a preferred embodiment of the invention, given by way of a non-restrictive illustration, and the appended drawings, of which.

DESCRIPTION OF PREFERRED EMBODIMENTS

Figure 1:
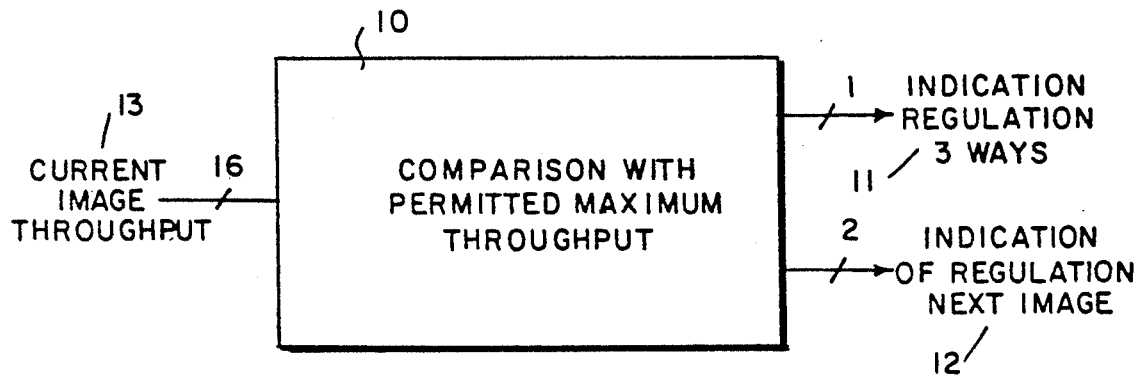
FIG. 1 shows the inputs/outputs of a regulation module according to the invention.

The selected approach consists in making a choice, in each image zone, among four possible types of sub-sampling. The optimum sub-sampling is chosen at the encoder and the corresponding sub-sampled pixels are transmitted to the decoder. In addition, this decoder receives the assistance data that enable it to reconstruct the HD (high definition) image as efficiently as possible.

Four sub-sampling processing operations are possible:

3 linear filtering processing operations, namely:

1 filtering operation for zero motions (way 1), 1 filtering operation for motions of mean amplitude (way 2), 1 filtering operation for motions of high amplitude (way 3).

The fourth processing operation is a processing operation that uses motion compensation (way 4).

The assistance data encoding method can be applied to a system of four ways, one of which uses motion compensation. This method consists in a hierarchical imbricated encoding which segments the processing choice image into homogeneous blocks and superblocks with the same processing choice and with variable sizes. The motion vectors are transmitted only for the blocks processed by the motion compensation way.

The drawback of a method such as this is that the resultant throughput is variable. In particular, the throughput is substantially increased when the number of vectors to be transmitted increases greatly (i.e. when the way using the motion compensation is chosen).

The method according to the invention can be used to regulate the throughput of assistance data. This regulation occurs in two forms:

a sudden regulation 11 providing, for each image, a throughput rate smaller than the throughput rate of the channel: in this case, the image is encoded by a system using only ways with low throughput consumption (the 3 linear filtering ways);

a fine regulation 12: if, at the image n, the throughput of the AD is above a threshold, the amplitude of the errors enabling the choice of the processing operation on the elementary blocks is multiplied by a greater coefficient, for the way using motion compensation only, for the image n+1.

Figure 6:
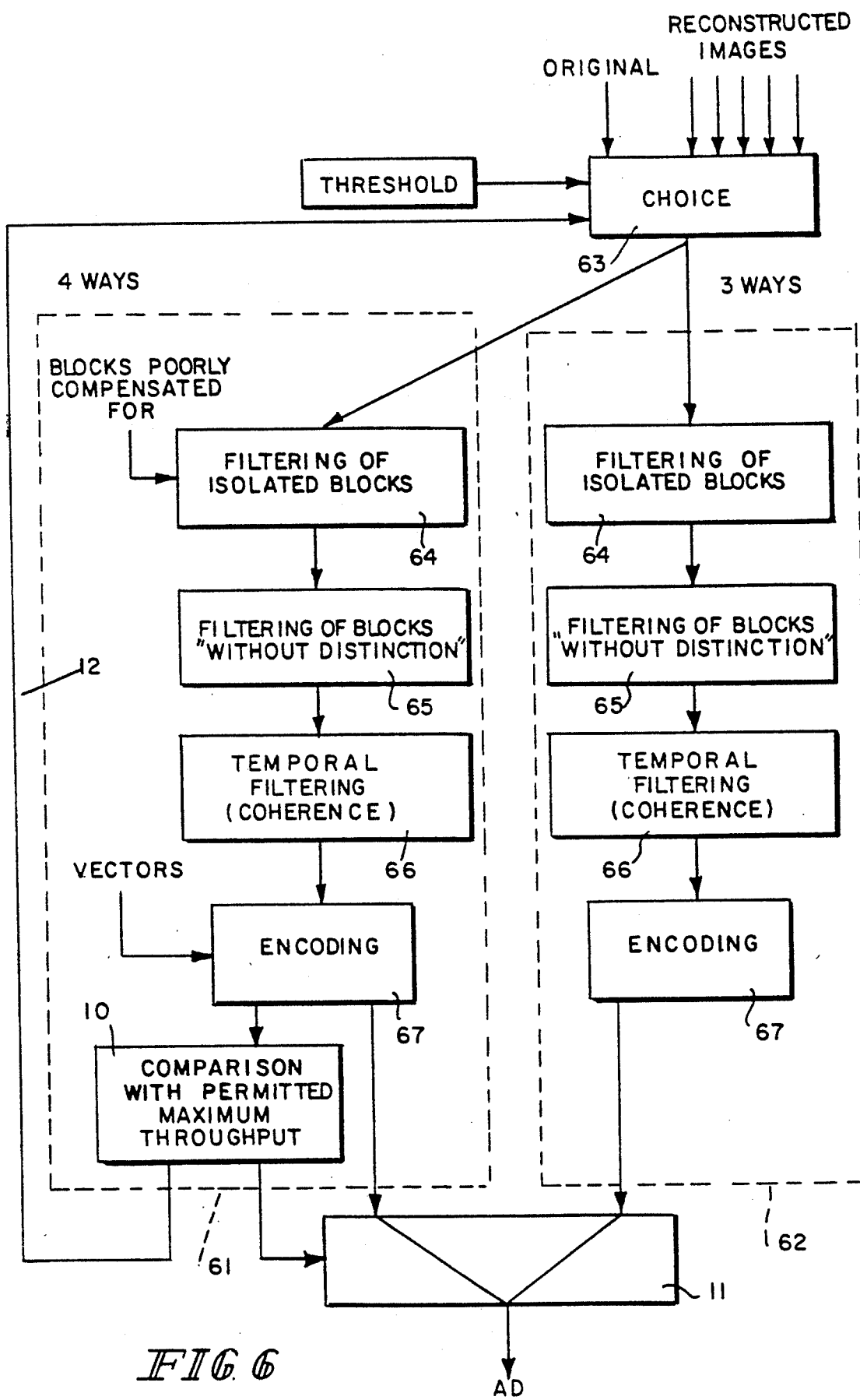
FIG. 6 is a general diagram representing the two processing chains with three ways and four ways respectively, on the basis of which the measurement of the throughput rate and the enforcing of the processing choice, according to the invention, are done. The method described below pertains specifically to the encoding of an HDTV image for transmission in an HMAC channel.

These two possibilities are shown in FIG. 6:

as the possibility of switching over 11 to the assistance data of a 3-way system 62 when the throughput rate 13 of assistance data for the 4-way system 61 is too great in relation to the maximum permitted throughput rate (10);

as a negative feedback 12 coming into play on the basis of the comparison 10 with the maximum permitted throughput rate.

For information on the processing choice modules 63, filtering of isolated blocks 64 and blocks 65 where no distinction is made, and temporal filtering operations 66, reference could be made to the French patent application No. 8802650 filed on Mar. 2nd, 1988, on behalf of the present applicants.

The method of this patent application describes a sub-sampling processing operation used for each image element, consisting in the choice of an optimal processing operation chosen from among several available processing operations tested in parallel, the efficiency of each processing operation being measured by a criterion of distortion of the processed signal with respect to the source signal, a method wherein, image elements, capable of accepting, without distinction, at least two distinct sub-sampling processings, are determined;

it is chosen to associate, with each of said image elements capable of accepting processings without distinction, that one of said processings, accepted without distinction, that enables optimal reduction in assistance data.

Advantageously, said step for the selection of image elements accepting processing without distinction, according to this prior invention, consists in searching, for each image element, whether there is a set of processings, among the available processings, such that each of the processings belonging to said set of processings accepted without distinction meets, at the same time, a condition of minimal distortion with respect to the other non-distinct available processing operations, and a condition of difference in distortion with set threshold with each of the other processing operations accepted without distinction.

According to this prior art invention, it is also possible to achieve a filtering operation on the image, for the elimination of isolated image elements, said filtering consisting in the scanning of the sub-sampled image with a moving filtering window, having a size of n×n image elements and preferably, 3×3 image elements, and to modify the sub-sampling processing operation associated with at least one central image element for each position on the image of the moving window, should the processing associated with said central image element be different from a majority processing and/or a mean processing associated with the other image elements inside said window.

Advantageously, said filtering operation for the elimination of isolated blocks is done before the operation for enforcing the processing choice, for the blocks accepting processing operations without distinction.

The computation of the throughput used in the present invention is based on the imbricated hierarchical encoding 67 described in the joint French patent application cited in the introduction.

This parallel patent application describes a method for the encoding of data for assistance in the reconstruction of an electronic image belonging to a sequence of images, notably HDTV images, using a compressed image signal, the process of compression of the image signal consisting in the segmentation of the image into substantially homogeneous blocks of variable sizes i×i for which all the pixels may be defined collectively, the possible sizes being capable of classification according to levels of segmentation, from a minimal size of elementary blocks, each level corresponding to the regrouping of four lower level adjacent blocks, said compression process comprising a selection step, for each elementary image block, of an optimal processing among several concurrent compression processing operations achieved in parallel, the processing operations comprising notably, on the one hand, at least one compression processing operation by image filtering and, on the other hand, at least one compression processing operation by motion compensation, a method wherein said assistance data comprise, essentially, for each block, firstly a piece of information on the choice of processing associated with a piece of information on the segmentation of the block, and secondly, in case of a choice of compression processing by motion compensation for the current block, a piece of motion vector information representative of said block associated with a piece of information on segmentation of the block, and wherein, in a first stage, a hierarchical encoding in increasing order is achieved, on at least two levels of segmentation, for the information on choice of processing operation and, in a second stage, in case of a choice of processing with motion compensation for a non-elementary block identified in the first stage, a hierarchical encoding in increasing order, on at least two levels of segmentation, for the motion information, and wherein said assistance data are generated under the control of sequencing means locked into a pre-determined image scanning procedure, in selectively generating pieces of segmentation information only for the non-elementary blocks and in selectively generating pieces of information on motion vector choice only during the occurrence of a block with optimal processing by motion compensation.

According to this parallel patent application, said assistance data are advantageously generated in the form of a sentence of variable length, emitted for each superblock of the maximal level of segmentation, each sentence comprising at least one of the following words:

a first word identifying the processing choice segmentation in said superblock;

at least one second word identifying said processing associated with each homogeneous i×i block of a maximal level;

a third word identifying the segmentation of motion in said superblock;

at least one fourth word identifying the motion vector at each i×i block of maximum level with processing by motion compensation and homogeneous motion vector.

In the present invention, the encoding 67 of the ADs for the three ways 62 is identical to that of the 4 ways 61 and may be done by the same modules in enforcing the value of the error for the way 4 to an arbitrarily high value in the choice module 63.

The formatting of the assistance data for the three ways advantageously consists in transmitting two bits indicating the processing operation chosen among 3 for each of the elementary blocks. The resultant throughput is 25.920 bits (for there are 12.960 elementary blocks in the image) and is always smaller than the throughput rate of the channel (around 30,000 bits/image).

Figure 2:
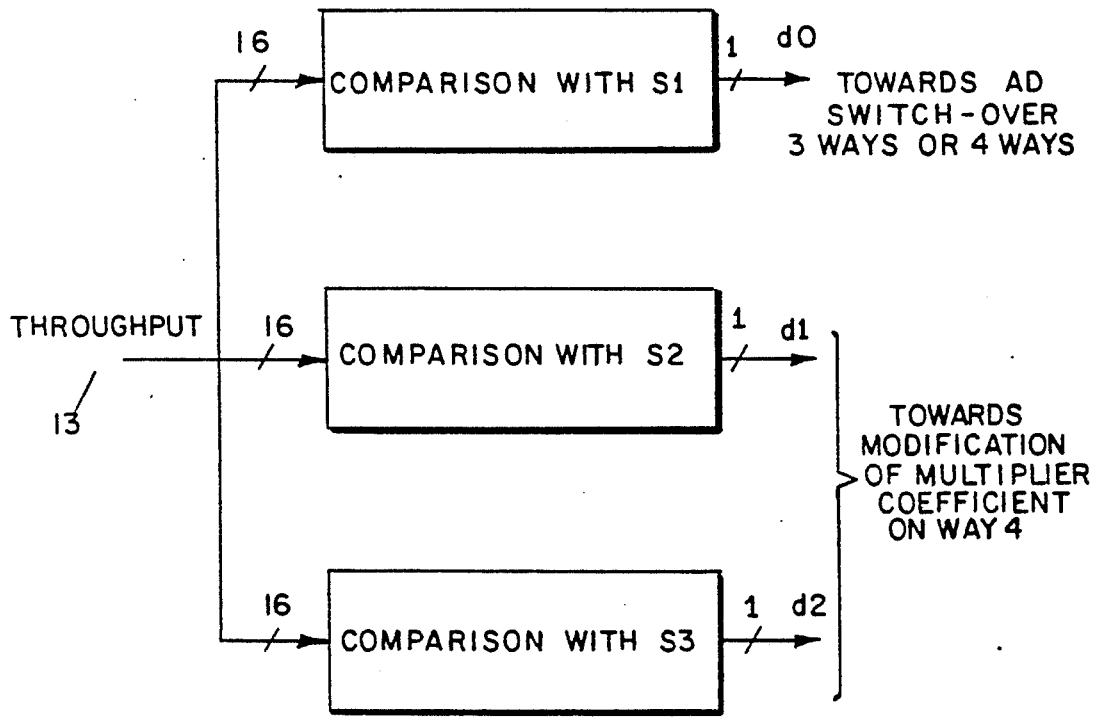
FIG. 2 illustrates a selective regulation processing mode, with stages according to the current throughput rate of assistance data according to the invention.
Figure 3:
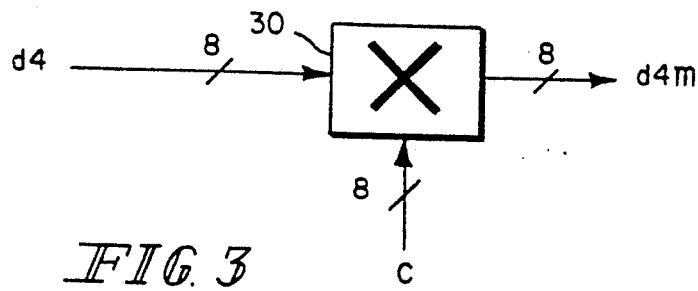
FIG. 3 is a block diagram illustrating the inputs/outputs of a module for the modification of the measurement of distortion on a motion compensation mode or way according to the invention.

The fact that the AD is transmitted for 4 ways or 3 ways is indicated to the decoder at the start of each image, preferably in the form of a bit. This bit, positioned at "1" indicates that the processing is normal (4 way processing), and, when positioned at "0", it indicates that there has been regulation (enforcing in 3 ways). The transmission of this information is indispensable, for the formatting of the AD data is different in the two cases. The module for comparison with the permitted maximum throughput rate, shown schematically in FIGS. 1 and 2, is the central module of regulation.

This regulation is advantageously done in images, i.e., for each image, the throughput rate of assistance data remains smaller than that of the channel. The throughput rate 13 of the image n is given by the encoding module of the 4 way AD. The permitted maximum throughput for the AD is 33360 bits per image.

if the throughput rate 13 is greater than 33360 bits (S1), the AD of the 3 ways is transmitted and for the image n+1, the multiplier coefficient on the way 4, C, is multiplied by 1.1 (41).

if the throughput 13 ranges between 30 Kbits (S2) and 33360 Kbits (S1) the 4 way AD is transmitted and the coefficient is multiplied by 1.1 (41).

if the throughput rate 13 is between 25 Kbits (S3) and 30 Kbits (S2), the 4 way AD is transmitted and the coefficient is divided by 1.05 (42). However, it remains greater than 1.

The thresholds (S1, S2, S3) (33360, 30000, 25000) may be any other values, advantageously, encodable on 16 bits.

Figure 4:
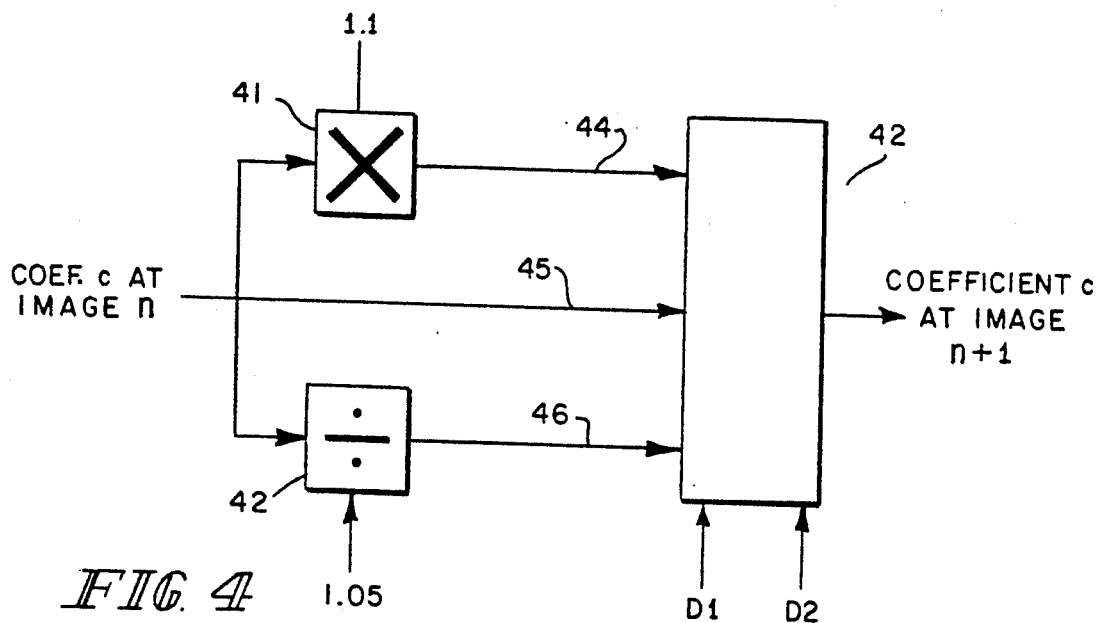
FIG. 4 is a block diagram illustrating the artificial increase/decrease of the processing choice criterion (values of distortions induced by the processing operation of compression by motion compensation)
Figure 5:
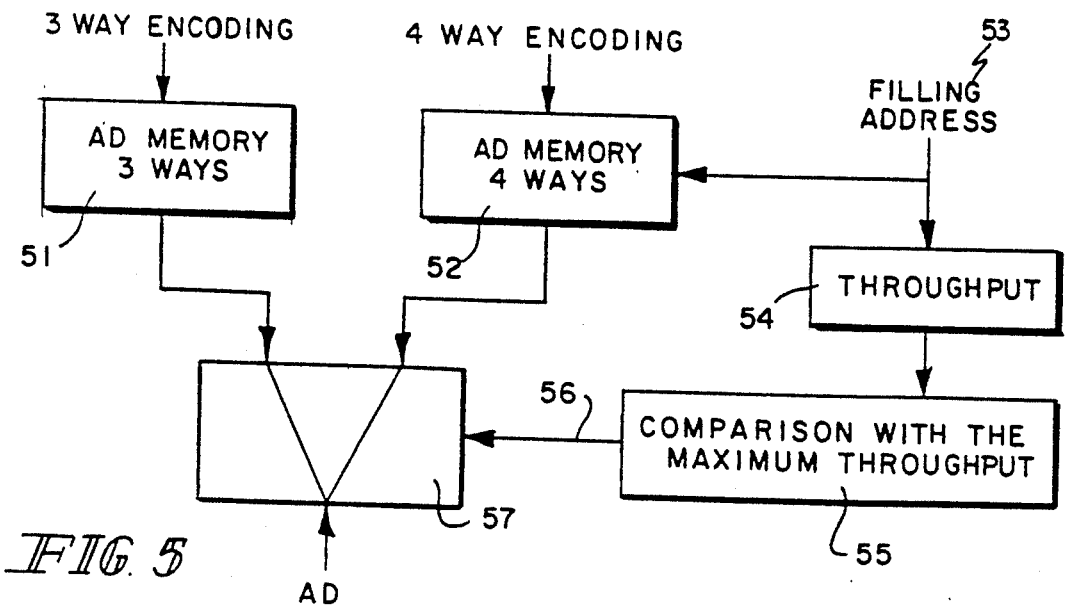
FIG. 5 is a block diagram illustrating the principle of sudden regulation of throughput rate according to the invention, by enforced switching over towards a filtering processing operation with low throughput consumption.

The embodiment illustrated in FIGS. 2 and 4 consists in generating notably information d0, d1, d2 representing the situation of the current throughput 13 of assistance data with respect to the thresholds S1, S2, S3.

The bits d1 and d2 act as selection values in a circuit 43 for the choice of one of the ways 44, 45, 46 of multiplication 41, absence of specific processing, and division 42, respectively; of the coefficient c of artificial modification of the distortions induced by the way 4.

In effect, in the choice module 63, computations are done of the errors on the ways 1, 2, 3 and 4 which enable the optimum processing choice to be made. When there is no enforcing, this optimal processing is that inducing the smallest distortion in the reconstructed image.

The error on the way 4 (called a distortion d4) is systematically multiplied (30) by C and gives a modified distortion d4m.

The value of C may be modified image by image. The data resulting from the 3 ways and 4 ways encoding are stored in two memories 51, 52.

The 3 way (51) and 4 way (52) AD memories are advantageously 64-Kbit sized FIFOs. The filling address 54 of the 4 way memory 52 at the end of the image gives the throughput obtained 54 and, hence, the indication 56 of the switching over 57 between the 3 ways and the 4 ways, by comparison 55 with the maximum throughput rate permitted.

What is claimed is:

1. A method for the regulation of the data throughput rate, notably the throughput rate of assistance data in the reconstruction of an electronic image belonging to a sequence of images, notably in HDTV, using a compressed image signal, to maintain the assistance data throughput at a rate less than the maximum throughput rate for a transmission unit, the method comprising the steps of:

segmenting the image into substantially homogeneous blocks of variable sizes, all the pixels of which can be defined collectively, the possible sizes being capable of classification from a minimal size of elementary blocks, in segmentation levels, each level corresponding to the regrouping of four adjacent lower-level blocks, selecting for each elementary image block, an optimum processing operation among several concurrent, compression processing operations achieved in parallel, the processing operations including at least one first processing operation with low data throughput consumption, of an image filtering type, the at least one first processing operation being a subsampling processing type operation in which said assistance data includes an indicator of the selected processing operation and including at least one second processing operation with high data throughput consumption, of a compression by motion compensation type, consisting in associating a motion vector with each block for the reconstruction of the projection of the current block in the following image in the sequence, in which the assistance data also includes said motion vectors, and wherein, in said step of selecting an optimum processing operation, one of said low data throughput consumption first processing operations is selected when the throughput rate of said assistance data approaches or exceeds the throughput rate permitted by the transmission unit.

2. A method according to claim 1, wherein said transmission unit is formed by each image of said image sequence.

3. A method according to claim 1, wherein said step of selecting an optimum processing operation includes the step of imposing the choice of a processing operation with low data throughput consumption for all the blocks of the current transmission unit when the throughput rate permitted for the preceding transmission unit is exceeded.

4. A method according to claim 1, wherein said step of selecting an optimum processing operation further comprises the step of modifying the criterion of processing selection in order to cause variation in the threshold of processing without discrimination or distinction, enabling the selective keeping of the choice of the high data throughput consumption processing for images for which said processing is optimal.

5. A method according to claim 4 wherein, said optimal processing selection is done on the basis of a criterion of minimization of the psychovisual distortions induced in the reconstructed image, and said step modifying the criterion includes respectively increasing and decreasing the value of the distortions induced by said processing with high data throughput consumption.

6. A method according to claims 4 or 5, wherein said step of modifying the processing selection criterion is done selectively according to a rate chosen from among at least two distinct rates of modification, in using a rate of modification which is all the greater as the current data throughput is high.

* * * * *